(12) United States Patent
Shimamoto et al.

(10) Patent No.: US 11,757,385 B2
(45) Date of Patent: Sep. 12, 2023

(54) MOTOR CONTROL SYSTEM, ENCODER, AND SERVO MOTOR

(71) Applicant: KABUSHIKI KAISHA YASKAWA DENKI, Kitakyushu (JP)

(72) Inventors: Keita Shimamoto, Kitakyushu (JP); Koji Uemura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 161 days.

(21) Appl. No.: 17/386,539

(22) Filed: Jul. 28, 2021

(65) Prior Publication Data
US 2021/0359625 A1     Nov. 18, 2021

Related U.S. Application Data

(63) Continuation of application No. PCT/JP2019/003274, filed on Jan. 31, 2019.

(51) Int. Cl.
*H02P 6/10*     (2006.01)
*H02P 6/17*     (2016.01)
(Continued)

(52) U.S. Cl.
CPC .............. *H02P 6/10* (2013.01); *G01D 5/2454* (2013.01); *H02P 6/17* (2016.02); *H02P 23/0004* (2013.01);
(Continued)

(58) Field of Classification Search
CPC .......... H02P 6/10; H02P 6/17; H02P 23/0004; H02P 23/04; H02P 23/14; H02P 29/40; H02P 6/16; H02P 23/20; G01D 5/2454
(Continued)

(56) References Cited

U.S. PATENT DOCUMENTS 5,115,418 A     5/1992  Shimada
6,894,450 B2 *  5/2005  Cheng .................... H02P 25/03
                                                    318/400.11
(Continued)

FOREIGN PATENT DOCUMENTS

JP     H07-191707      7/1995
JP     2014-45556      3/2014
(Continued)

OTHER PUBLICATIONS

International Search Report for corresponding International Application No. PCT/JP2019/003274, dated Apr. 9, 2019.
(Continued)

*Primary Examiner* — David Luo
(74) *Attorney, Agent, or Firm* — MORI & WARD, LLP

(57) ABSTRACT

A motor control system includes a motor, an encoder, and a controller including a controller transmitter configured to transmit a torque command to control the motor. The encoder includes a position detector configured to detect a rotational position of the motor, an encoder receiver configured to receive the torque command from the controller transmitter, first disturbance estimating circuitry configured to estimate a first disturbance torque based on the rotational position and the torque command, and an encoder transmitter configured to transmit the rotational position and the first disturbance torque to the controller.

17 Claims, 15 Drawing Sheets

(51) Int. Cl.
*H02P 29/40* (2016.01)
*G01D 5/245* (2006.01)
*H02P 23/00* (2016.01)
*H02P 23/04* (2006.01)
*H02P 23/14* (2006.01)

(52) U.S. Cl.
CPC .............. *H02P 23/04* (2013.01); *H02P 23/14* (2013.01); *H02P 29/40* (2016.02)

(58) Field of Classification Search
USPC .............................. 318/400.23, 400.01, 700
See application file for complete search history.

(56) References Cited

U.S. PATENT DOCUMENTS

| | | | | |
|---|---|---|---|---|
| 7,557,530 | B2* | 7/2009 | Tesch | H02P 6/185 |
| | | | | 318/773 |
| 10,112,305 | B2* | 10/2018 | Kuno | B25J 9/1674 |
| 2014/0055074 | A1 | 2/2014 | Yoshiura et al. | |
| 2017/0193817 | A1 | 7/2017 | Ogawa | |
| 2018/0036877 | A1 | 2/2018 | Kamikawa et al. | |

FOREIGN PATENT DOCUMENTS

| | | |
|---|---|---|
| JP | 2017-085730 | 5/2017 |
| WO | WO 2016/042636 | 3/2016 |
| WO | WO 2016/136298 | 9/2016 |

OTHER PUBLICATIONS

Extended European Search Report for corresponding EP Application No. 19913121.0-1202, dated Aug. 4, 2022.

\* cited by examiner

MOTOR CONTROL SYSTEM, ENCODER, AND SERVO MOTOR

CROSS-REFERENCE TO RELATED APPLICATIONS

The present application is a continuation application of International Application No. PCT/JP2019/003274, filed Jan. 31, 2019. The contents of this application are incorporated herein by reference in their entirety.

BACKGROUND OF THE INVENTION

Field of the Invention

The disclosed embodiments relate to a motor control system, an encoder, and a servo motor.

Discussion of the Background

Japanese Unexamined Patent Application Publication No. H07-191707 describes a controller. The controller includes an encoder for detecting a controlled variable of a servo motor and a DSP (digital signal processor) for receiving the controlled variable that is detected. The DSP has an observer for estimating the disturbance torque Td and a PI controller. The DSP performs a PI control in which the disturbance torque Td is compensated.

In this controller, control performance has been expected to be improved.

SUMMARY OF THE INVENTION

According to one aspect of the present disclosure, a motor control system includes a motor, an encoder, and a controller including a controller transmitter configured to transmit a torque command to control the motor. The encoder includes a position detector configured to detect a rotational position of the motor, an encoder receiver configured to receive the torque command from the controller transmitter, first disturbance estimating circuitry configured to estimate a first disturbance torque based on the rotational position and the torque command, and an encoder transmitter configured to transmit the rotational position and the first disturbance torque to the controller.

According to another aspect of the present disclosure, an encoder includes a position detector configured to detect a rotational position of a motor, an encoder receiver configured to receive a torque command from a controller transmitter of a controller to control the motor, disturbance estimating circuitry configured to estimate a disturbance torque based on the rotational position and the torque command, and an encoder transmitter configured to transmit the rotational position and the disturbance torque to the controller.

According to the other aspect of the present disclosure, a servo motor includes a motor and an encoder. The encoder includes a position detector configured to detect a rotational position of the motor, an encoder receiver configured to receive a torque command from a controller transmitter of a controller to control the motor, disturbance estimating circuitry configured to estimate a disturbance torque based on the rotational position and the torque command, and an encoder transmitter configured to transmit the rotational position and the disturbance torque to the controller.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

DESCRIPTION OF THE EMBODIMENTS

Hereinafter, an embodiment will be described with reference to the drawings.

1. Motor Control System

First, an example of a configuration of a motor control system according to the present embodiment will be described with reference to FIG. 1.

Figure 1:
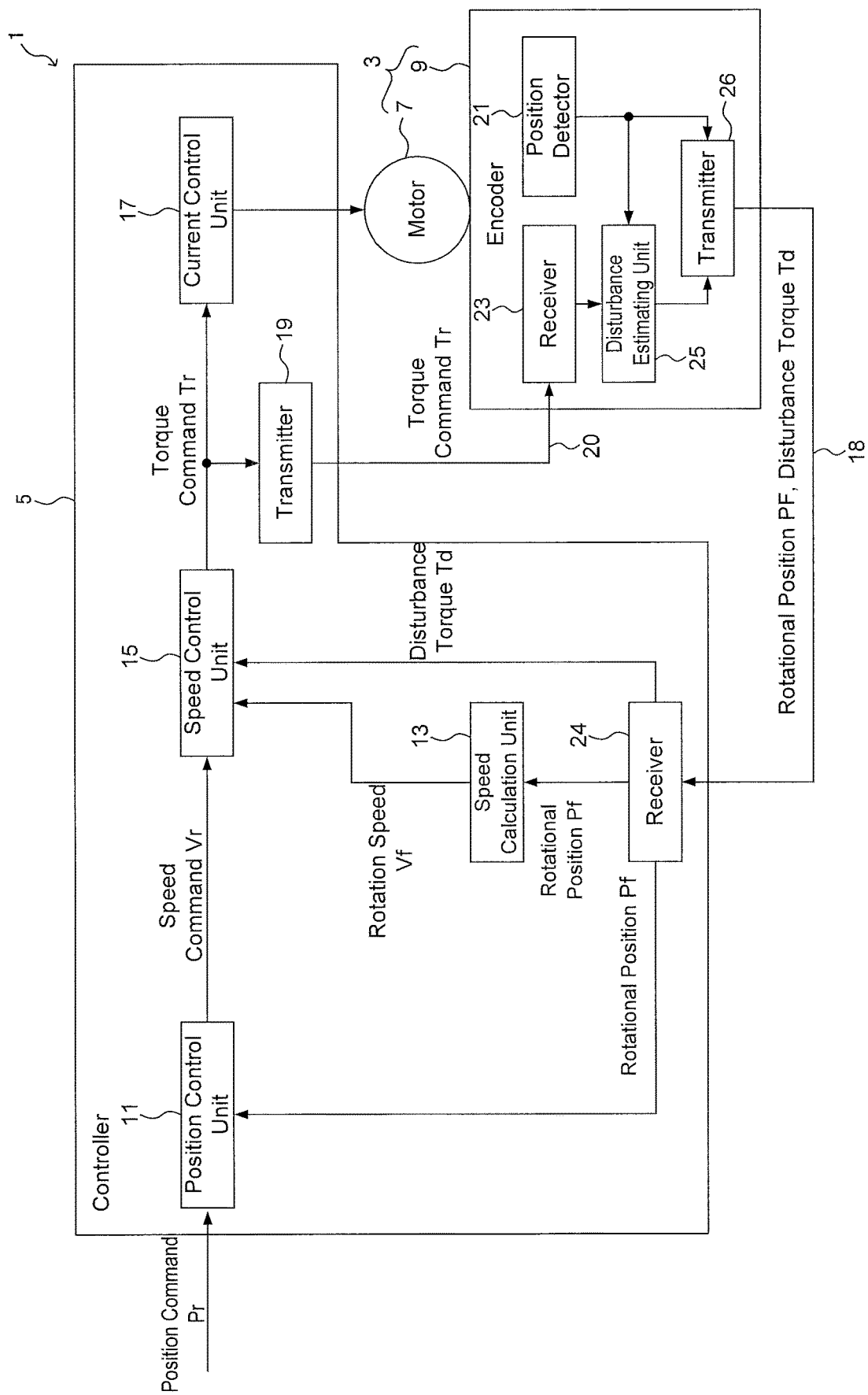
FIG. 1 is a diagram illustrating an example of a configuration of a motor control system according to the present embodiment.

As shown in FIG. 1, the motor control system 1 includes a servo motor 3 and a controller 5. The servo motor 3 includes a motor 7 and an encoder 9.

The controller 5 controls the servo motor 3. The controller 5 includes a position control unit (position control circuitry) 11, a speed calculation unit (speed calculation circuitry) 13, a speed control unit (speed control circuitry) 15, and a current control unit 17. The position control unit 11 outputs a speed command Vr based on a position command Pr input from the host controller (not shown) and the rotational position Pf received from the transmitter 26 of the encoder 9 via the communication path 18. The speed calculation unit 13 calculates the rotation speed Vf by performing, for example, first order differentiation on the rotational position Pf received from the encoder 9. The speed control unit 15 outputs a torque command Tr based on the speed command Vr and the rotation speed Vf calculated by the speed calculation unit 13. The current control unit 17 converts the torque command Tr into a current command using a parameter of the motor 7, and supplies drive power to the motor 7 based on the current command to drive the motor 7.

The controller 5 includes a transmitter 19. The transmitter 19 (an example of a controller transmitter) transmits the torque command Tr generated by the speed control unit 15 to the encoder 9 via the communication path 20. The transmitter 19 transmits a position data request signal requesting transmission of the rotational position Pf to the encoder 9 via the communication path 20. The communication path 18, 20 is normally configured as a wired path, but may be configured as a wireless path. In addition, the controller 5 may be configured as a single unit, or may be configured by, for example, a plurality of units or devices.

The processes in the position control unit 11, the speed calculation unit 13, the speed control unit 15, the current control unit 17, the transmitter 19, and the like described above are not limited to the examples of the sharing of these processes. For example, the processes may be performed by a smaller number of processing units (for example, one processing unit) or may be performed by more subdivided processing units. In the controller 5, only a portion (such as an inverter) that supplies drive power to the motor 7 is implemented by an actual device, and other functions are implemented by a program executed by a CPU901 (see FIG. 15) described later. Some or all of the components may be implemented by an actual device such as an ASIC, an FPGA, or other electric circuits. In the present embodiment, the processing by the position control unit 11, the speed calculation unit 13, the speed control unit 15, the current control unit 17, the transmitter 19, and the like described above is executed at an interval of the calculation cycle Ts determined by the performance of the CPU901 or the like.

The encoder 9 is configured separately from the controller 5, detects the rotational position Pf of the motor 7, and transmits the rotational position Pf to the controller 5 via the communication path 18. The encoder 9 includes a position detector 21, a receiver 23, a disturbance estimating unit 25, and a transmitter 26. The position detecting unit 21 detects rotational position Pf of the motor 7. The receiving unit 23 (an example of the receiver on the encoder side) receives the torque command Tr from the transmitter 19 of the controller 5 via the communication path 20.

The disturbance estimating unit 25 (an example of first disturbance estimating circuitry) estimates the disturbance torque Td (an example of the first disturbance torque) based on the rotational position Pf and the torque command Tr. Specifically, based on the torque command Tr and the rotational position Pf of the motor 7 as a result of being driven by the torque command Tr, the disturbance estimating unit 25 calculates the rotational acceleration by performing calculation corresponding to second order differentiation of the rotational position Pf, and converts the rotational acceleration Af into the dimension of force (torque) by multiplying the rotational acceleration by a parameter (for example, moment of inertia or mass) of the motor 7. Since the torque thus calculated is a torque by an actual operation in which the motor 7 is actually driven by the torque command Tr, the disturbance torque Td is calculated by comparing these torques. The disturbance torque Td calculated in this manner includes, for example, a sudden load change, a force or torque applied from the outside, a difference between a command value and a force (torque) during actual operation caused by an error between the control model and the actual model, and the like.

The transmitter 26 (an example of an encoder transmitter) transmits the rotational position Pf detected by the position detecting unit 21 and the disturbance torque Td estimated by the disturbance estimating unit 25 to the controller 5 via the communication path 18. When receiving the position data request signal from the transmitter 19 of the controller 5 via the communication path 20, the transmitter 26 transmits the disturbance torque Td together with the rotational position Pf.

The rotational position Pf and the disturbance torque Td transmitted from the transmitter 26 of the encoder 9 are received by the receiving unit 24 of the controller 5 and output to each processing unit. The speed control unit 15 generates a torque command Tr based on the rotation speed Vf and the disturbance torque Td calculated by the speed calculation unit 13, and outputs the torque command Tr to the current control unit 17. Thus, the controller 5 performs the motor control in which the disturbance torque Td is compensated.

Note that the processing and the like in the position detecting unit 21, the receiving unit 23, the disturbance estimating unit 25, the transmitter 26, and the like described above are not limited to the examples of the sharing of the processing, and may be processed by a smaller number of processing units (for example, one processing unit) or may be processed by further subdivided processing units. The function of the processing unit of the encoder 9 is implemented by, for example, an application specific integrated circuit (ASIC). It should be noted that the present invention is not limited to the ASIC, implemented by a dedicated integrated circuit constructed for a specific application such as an FPGA. Some or all of the functions of the processing unit may be implemented by a program executed by a CPU (not shown). In the present embodiment, the processing by the position detecting unit 21, the receiving unit 23, the disturbance estimating unit 25, the transmitter 26, and the like described above is executed at an interval of the calculation cycle Tv determined by the performance of the ASIC or the like. The calculation cycle Tv is faster (shorter) than the calculation cycle Ts of the controller 5. Since the data transmission process by the transmitter 26 is executed when the position data request signal is received from the controller 5, the data transmission process by the transmitter 26 is actually executed at intervals of the calculation cycle Ts of the controller 5.

2. Delay Due to Disturbance Estimation

Next, with reference to FIGS. 2 to 4, an example of delay due to disturbance estimation in the motor control system 1 according to the present embodiment will be described in comparison with a motor control system 1' according to a comparative example.

Figure 2:
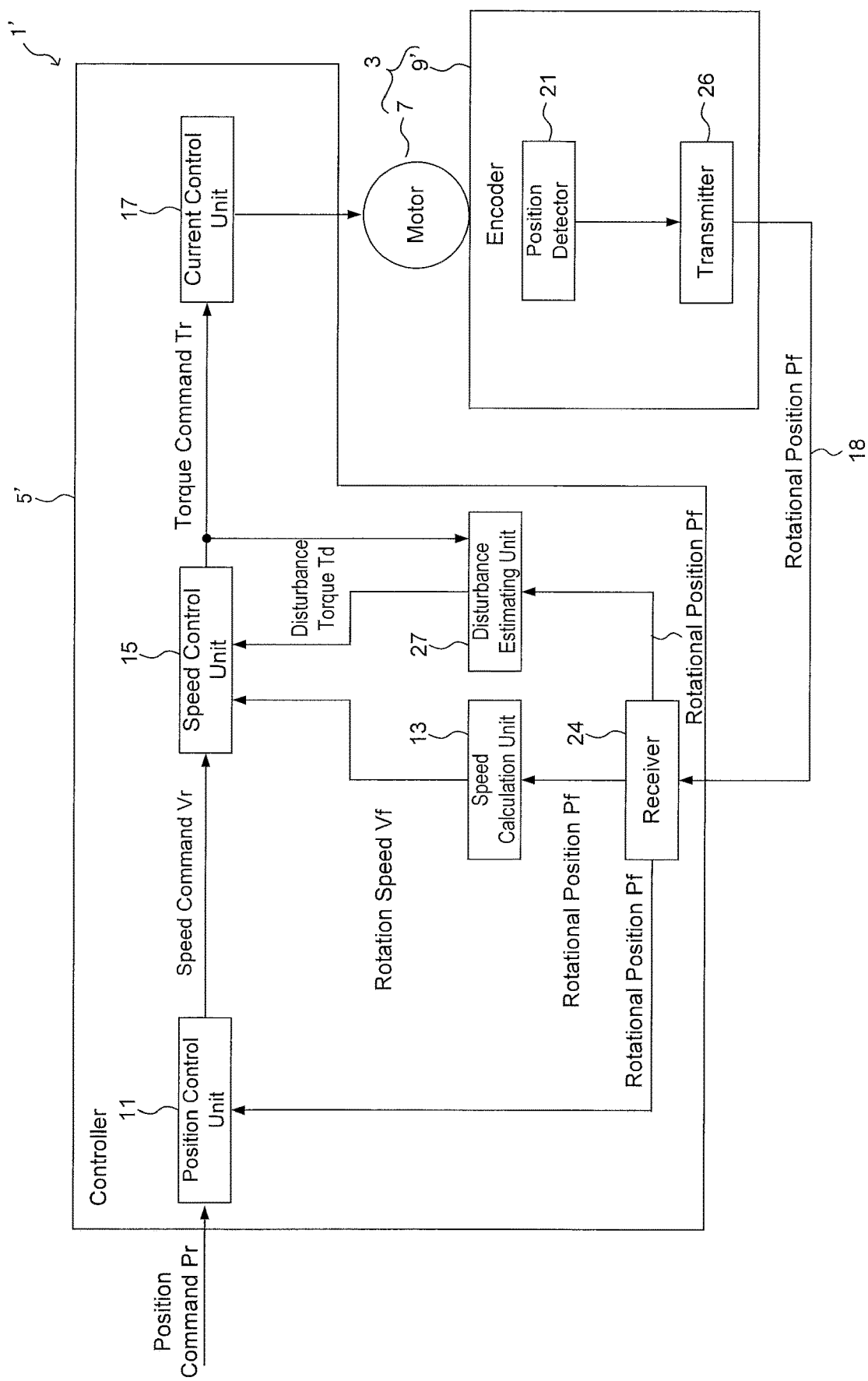
FIG. 2 is a diagram illustrating an example of a configuration of a motor control system according to a modification.

FIG. 2 shows an example of a configuration of a motor control system 1' according to a comparative example. As shown in FIG. 2, the motor control system 1' differs from the motor control system 1 according to the present embodiment in that the disturbance torque Td is estimated on the side of the controller. In the motor control system 1', the controller 5' includes the disturbance estimating unit (an example of second disturbance estimating circuitry) 27. The disturbance estimating unit 27 estimates the disturbance torque Td based on the torque command Tr output from the speed control unit 15 and the rotational position Pf received from the transmitter 26 of the encoder 9' via the communication path 18. The calculation method by the disturbance estimating unit 27 is the same as that of the disturbance estimating unit 25 described above. The speed control unit 15 generates a torque command Tr based on the rotation speed Vf and the disturbance torque Td, and outputs the torque command Tr to the current control unit 17. The processing by the disturbance estimating unit 27 is executed at intervals of the calculation cycle Ts determined by the performance of the CPU901 or the like.

Figure 3:
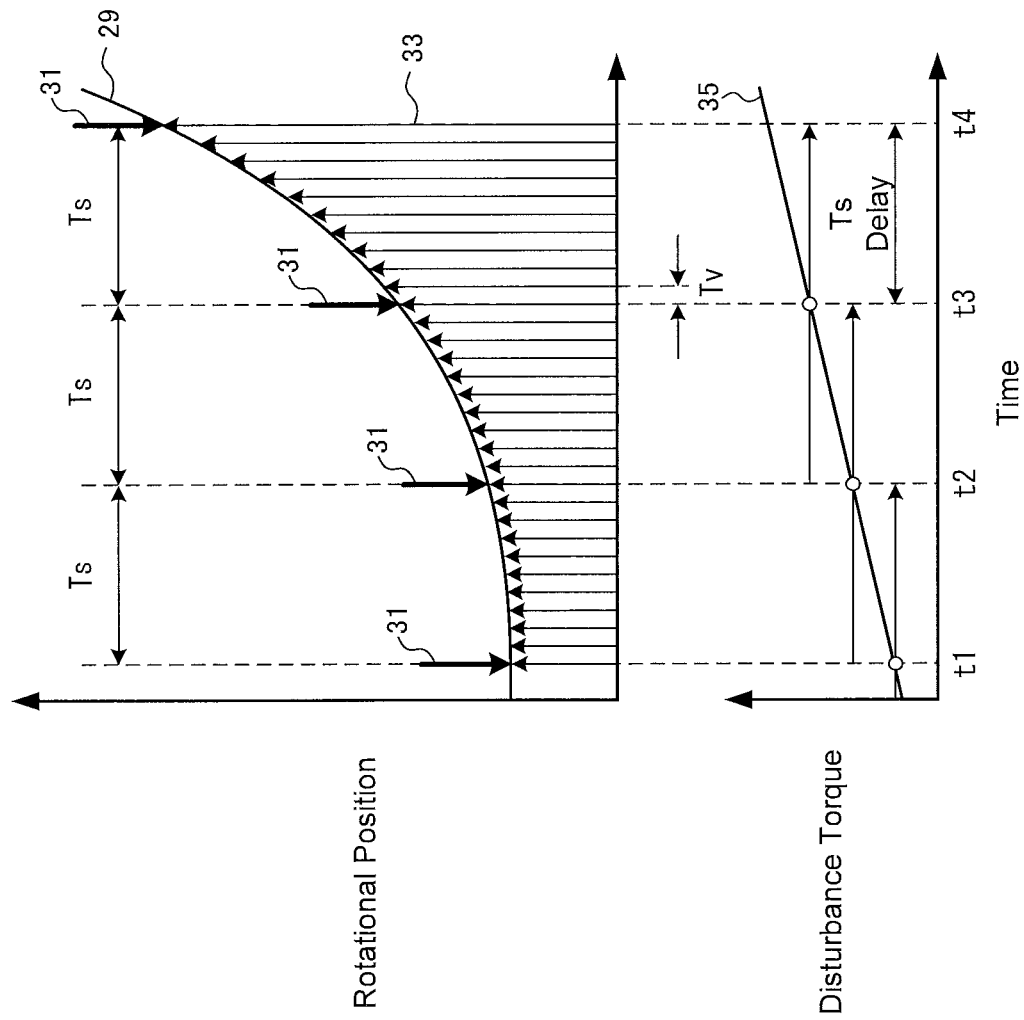
FIG. 3 is a diagram illustrating an example of a delay due to disturbance estimation in the motor control system according to the modification.

FIG. 3 shows an example of delay due to disturbance estimation in the motor control system 1' of the comparative example. In FIG. 3, in the upper graph, the horizontal axis indicates time and the vertical axis indicates the rotational position, and a curve 29 indicates an example of a temporal change in the rotational position Pf detected by the encoder 9'. An arrow 31 on the upper portion of the curve 29 indicates the timing at which the receiving unit 24 of the controller 5' receives the rotational position Pf, and is executed at intervals of the calculation cycle Ts of the controller 5'. On the other hand, an arrow 33 in the lower portion of the curve 29 indicates the timing at which the position detecting unit 21 of the encoder 9' detects the rotational position Pf, and is executed at intervals of the calculation cycle Tv of the encoder 9'. As shown in FIG. 3, the calculation cycle Tv is significantly faster than the calculation cycle Ts.

In the lower graph of FIG. 3, the horizontal axis represents time and the vertical axis represents the disturbance torque Td, and a straight line 35 represents an example of a temporal change in the disturbance torque Td estimated by the disturbance estimating unit 27. The times t1, t2, t3, and t4 correspond to the timing of the arrow 31, and the interval between each of the times is the calculation cycle Ts. For example, when the disturbance estimating unit 27 estimates the disturbance torque in the time t4, the calculation corresponding to the second order differential based on the rotational position Pf is required. Therefore, data up to two samples before the sampling data of the rotational position Pf is required. In this comparative example, since the time interval at which the disturbance estimating unit 27 acquires the rotational position Pf is the calculation cycle Ts, the time t3 and the rotational position Pf at the time t2 are necessary. The disturbance torque Td based on the rotational acceleration in the time t3 is obtained by calculation based on the position information and the torque command Tr in the time t3. Therefore, a relatively large delay of time Ts occurs between the disturbance torque and the time t4 to be estimated. As described above, in the motor control system 1' of the comparative example, the real-time property of the data of the rotational position Pf used for the disturbance estimation is reduced, and there is a possibility that good control performance for the motor 7 cannot be obtained. In addition, there is a possibility that a dead time is occurred, and thereby the frequency response of the disturbance compensation of the controller 5' cannot be raised.

Figure 4:
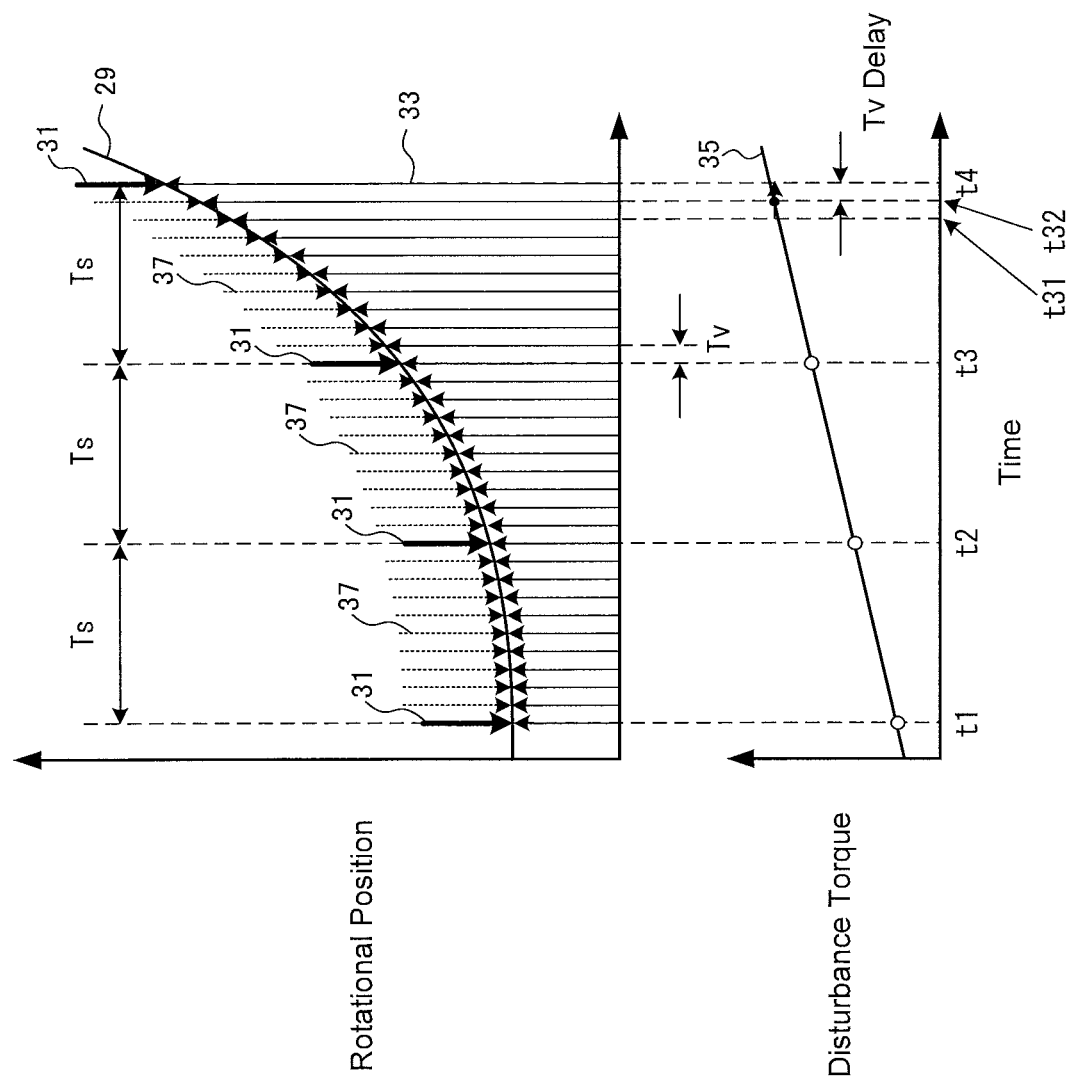
FIG. 4 is a diagram illustrating an example of delay due to disturbance estimation in the motor control system according to the present embodiment.

FIG. 4 shows an example of delay due to disturbance estimation in the motor control system 1 of the present embodiment. In FIG. 4, similarly to FIG. 3, in the upper graph, the horizontal axis indicates time and the vertical axis indicates the rotational position, and a curve 29 indicates an example of a temporal change in the rotational position detected by the encoder 9. An arrow 31 in an upper portion of the curve 29 indicates a timing at which the receiving unit 24 of the controller 5 receives the rotational position Pf and the disturbance torque Td and a timing at which the receiving unit 23 of the encoder 9 receives the torque command Tr (update timing of the torque command Tr), and is executed at intervals of the calculation cycle Ts of the controller 5. On the other hand, an arrow 33 in a lower portion of the curve 29 indicates a timing at which the position detecting unit 21 of the encoder 9 detects the rotational position Pf, and is executed at cycle Tv of the encoder 9. In the present embodiment, the disturbance estimating unit 25 of the encoder 9 estimates the disturbance torque in the same calculation cycle Tv as the position detection by the position detecting unit 21. An arrow 37 at the top of the curve 29 indicates the timing at which the disturbance estimation is performed.

In the lower graph of FIG. 4, similarly to FIG. 3, the horizontal axis represents time and the vertical axis represents the disturbance torque Td, and a straight line 35 represents an example of a temporal change in the disturbance torque Td estimated by the disturbance estimating unit 25. For example, when the disturbance estimating unit 25 estimates the disturbance torque in the time t4, the calculation corresponding to the second order differential based on the rotational position Pf is required. Therefore, data up to two samples before the sampling data of the rotational position Pf is required. In the present embodiment, since the time interval at which the disturbance estimating unit 25 acquires the rotational position Pf is the calculation cycle Tv, the time t32 and the rotational position Pf at the time t31 are necessary. The disturbance torque Td based on the rotational acceleration in the time t3 is obtained by calculation based on the position information and the torque command Tr in the time t32. Therefore, only a relatively small delay of time Tv occurs between the disturbance torque Td and the time t4 to be estimated. As described above, in the motor control system 1 of the present embodiment, since the real-time property of the data of the rotational position Pf used for the disturbance estimation can be improved, the disturbance estimation with high real-time property can be performed. As a result, a dead time in control can be reduced, a band of disturbance estimation can be expanded, and robustness against disturbance can be improved. Therefore, the control performance for the motor 7 can be enhanced.

3. Control Processing of Encoder

Next, an example of control processing executed by the ASIC of the encoder 9 will be described with reference to FIG. 5.

Figure 5:
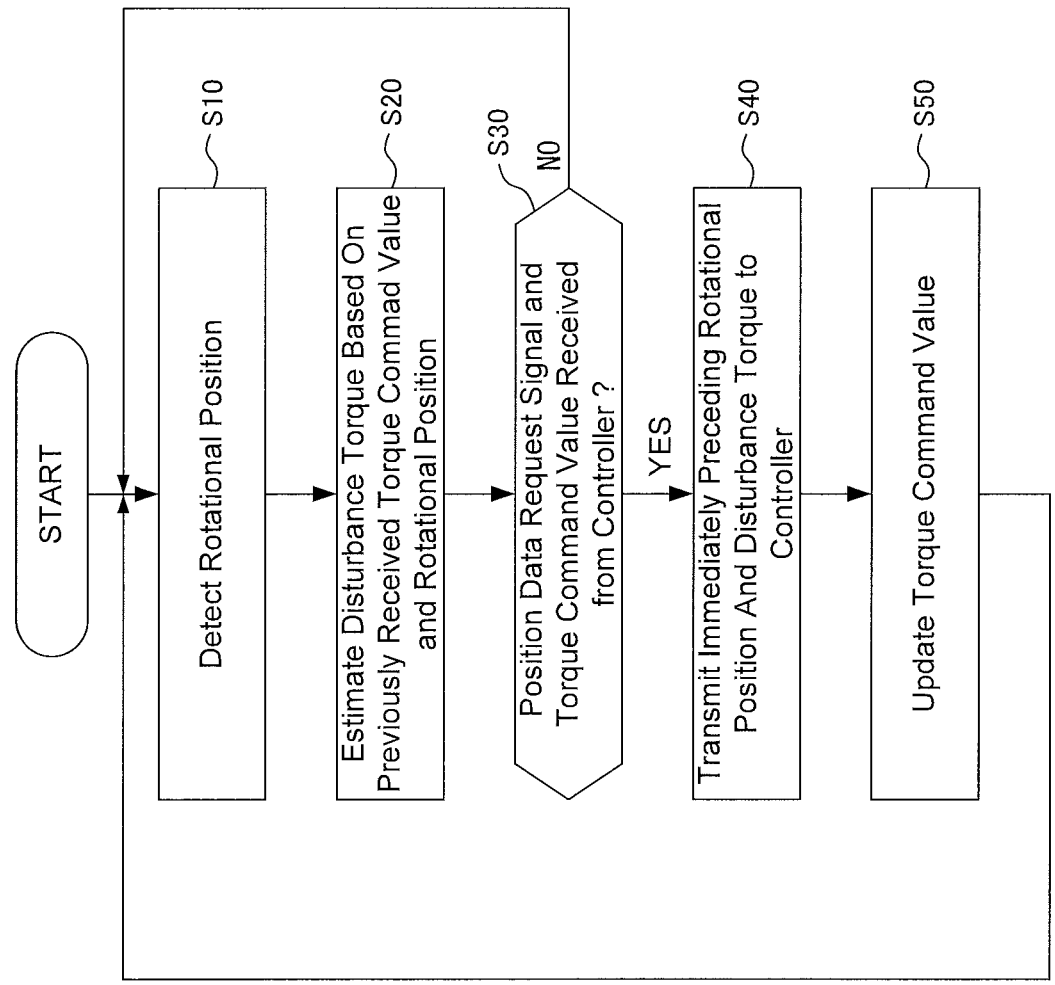
FIG. 5 is a flowchart showing an example of control processing executed by the ASIC of the encoder 9.

As shown in FIG. 5, in step S10, the encoder 9 detects the rotational position Pf of the motor 7 by the position detecting unit 21.

In step S20, the disturbance estimating unit 25 of the encoder 9 estimates the disturbance torque Td based on the rotational position Pf detected in step S10 and the torque command value (the torque command value updated in step S50 described later) previously received from the controller 5 by the receiver 23.

In step S30, the encoder 9 determines whether or not the position-data request signal and the torque command value are received from the controller 5 via the communication path 20 by the receiver 23. If not received (step S30: NO), the process returns to step S10. On the other hand, if it is received (step S30: YES), the process proceeds to step S40.

In step S40, the encoder 9 causes the transmitter 26 to transmit the immediately preceding rotational position Pf detected in step S10 and the immediately preceding disturbance torque Td estimated in step S20 to the controller 5 via the communication path 18.

In step S50, the encoder 9 updates the torque command value recorded in an appropriate recording unit to the latest torque command value received in step S30. Thereafter, the process returns to step S10 to repeat the same procedure.

4. Simulation Results

Next, an example of a simulation result will be described with reference to FIGS. 6 to 12. In FIGS. 6 to 12, in order to confirm the effect according to the present embodiment, simulation result in the motor control system 1 according to the present embodiment and the simulation result in the motor control system 1' according to the comparative example described above will be described while being compared with each other.

FIGS. 6 to 9 show examples of Bode diagrams obtained by simulation in a case where an input is an external force and an output is a disturbance estimation value. In this simulation, a sweep signal that changes from 1 Hz to 200 Hz in two seconds, for example, is input as external power. The cutoff frequencies in the disturbance estimation are set to 80 Hz, for example. In the figures, the broken line indicates the frequency characteristic of the comparative example, and the solid line indicates the frequency characteristic of the embodiment.

Figure 6:
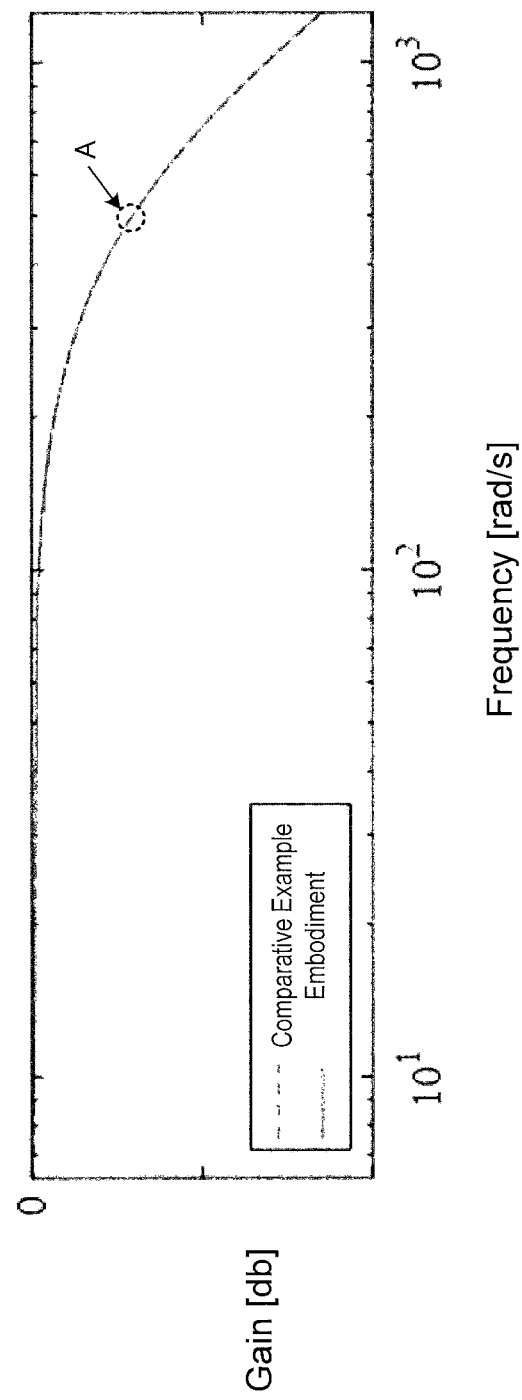
FIG. 6 is a Bode diagram illustrating an example of a simulation result in which an input is an external force and an output is a disturbance estimation value in the embodiment and the comparative example.
Figure 7:
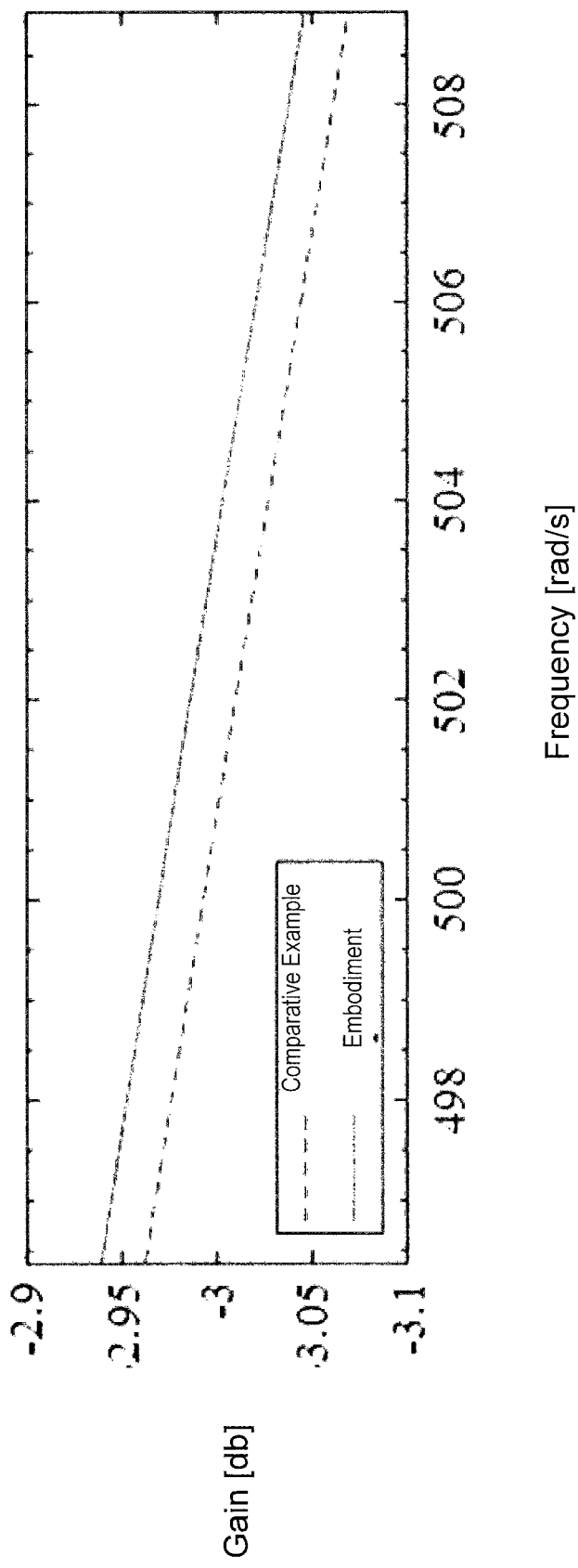
FIG. 7 is an enlarged view of part A of FIG. 6.
Figure 8:
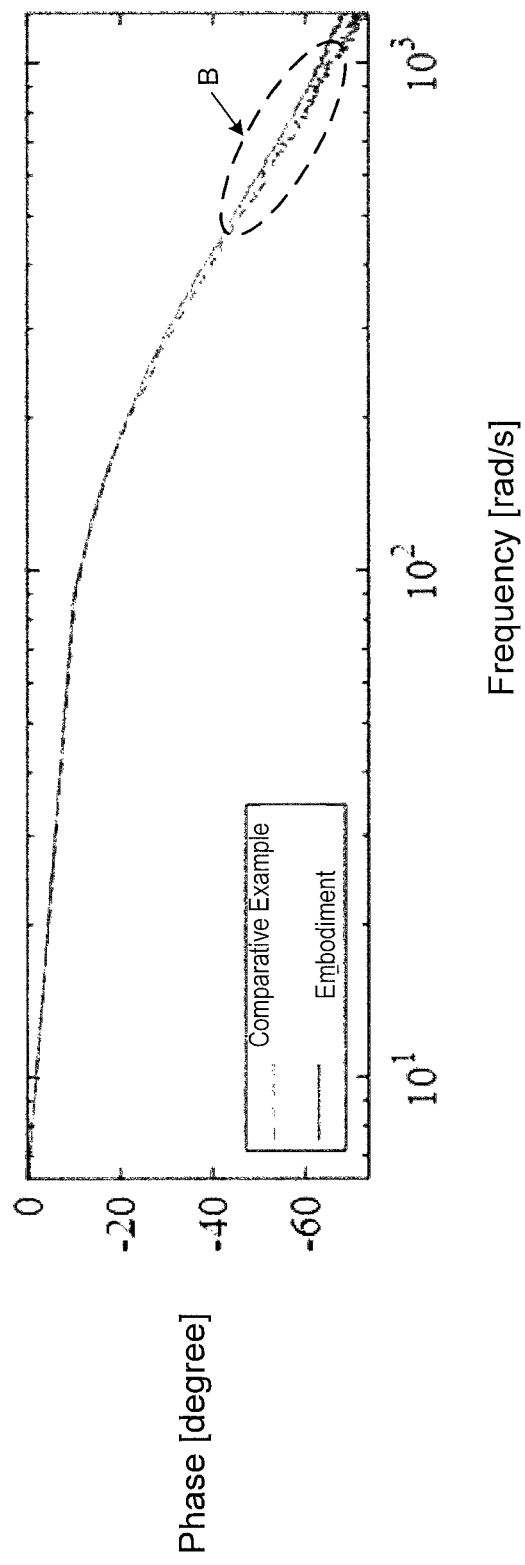
FIG. 8 is a Bode diagram showing an example of a simulation result in which an input is an external force and an output is a disturbance estimation value in the embodiment and the comparative example.
Figure 9:
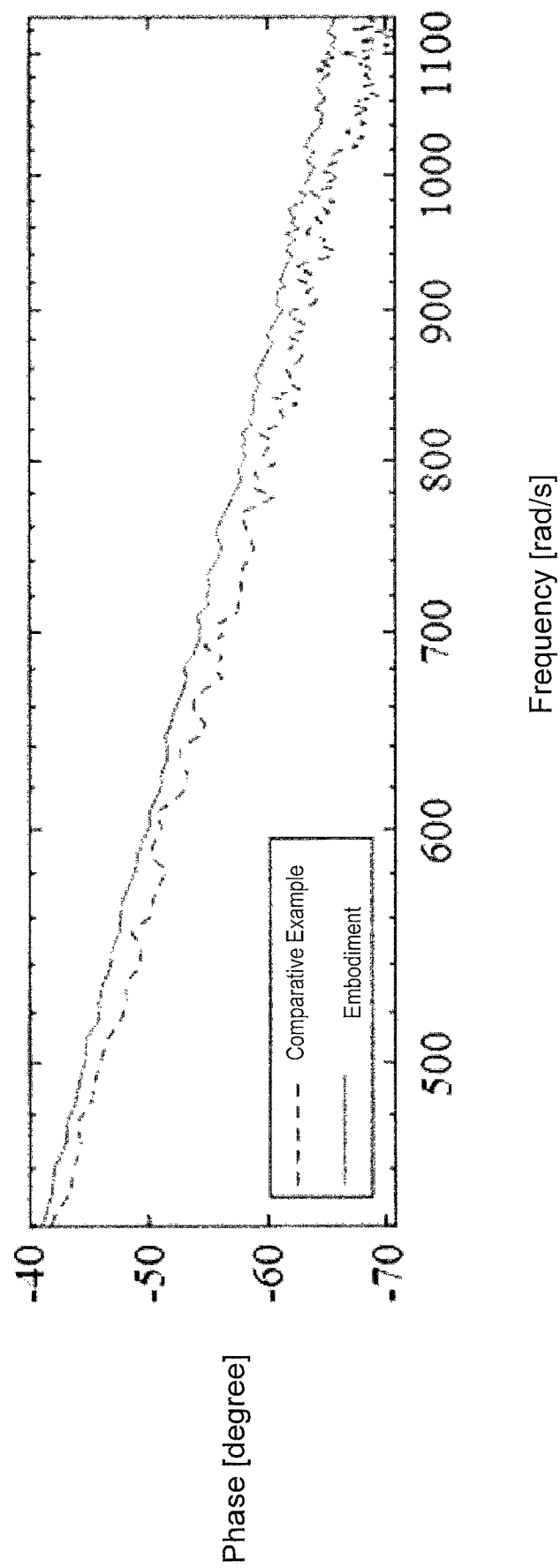
FIG. 9 is an enlarged view of a portion B in FIG. 8.

FIG. 7 is an enlarged view of part A of FIG. 6. As shown in FIGS. 6 and 7, the gain near the cutoff frequency is higher in the embodiment than in the comparative example. FIG. 9 is an enlarged view of a portion B of FIG. 8. As shown in FIGS. 8 and 9, the phase delay is smaller in the embodiment than in the comparative example. From the above, it can be seen that the disturbance estimation band can be more expanded in the embodiment than in the comparative example.

Figure 10:
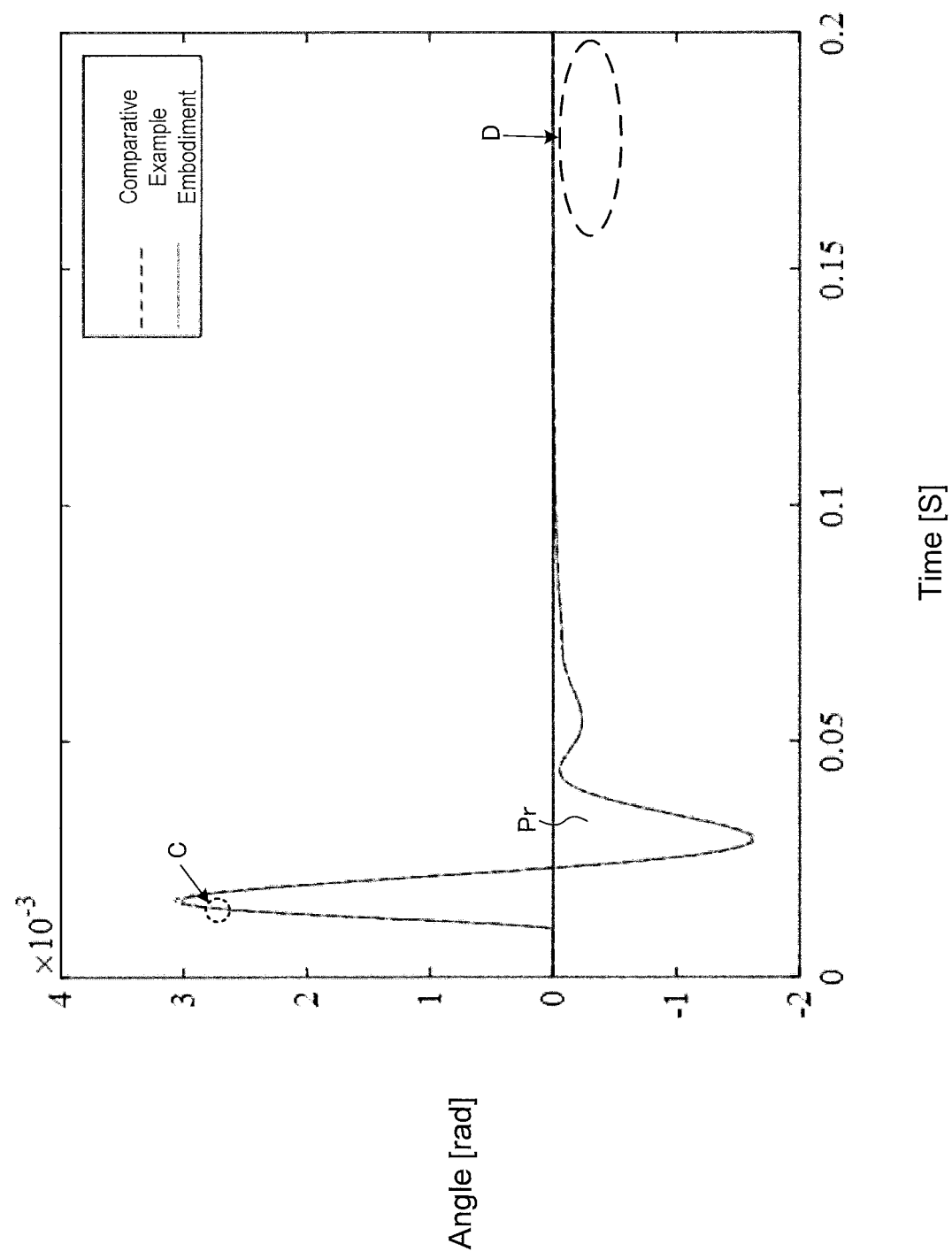
FIG. 10 is a diagram illustrating an example of a simulation result of a position response in a case where a step disturbance is input at the time of position fixation in the embodiment and the comparative example.
Figure 11:
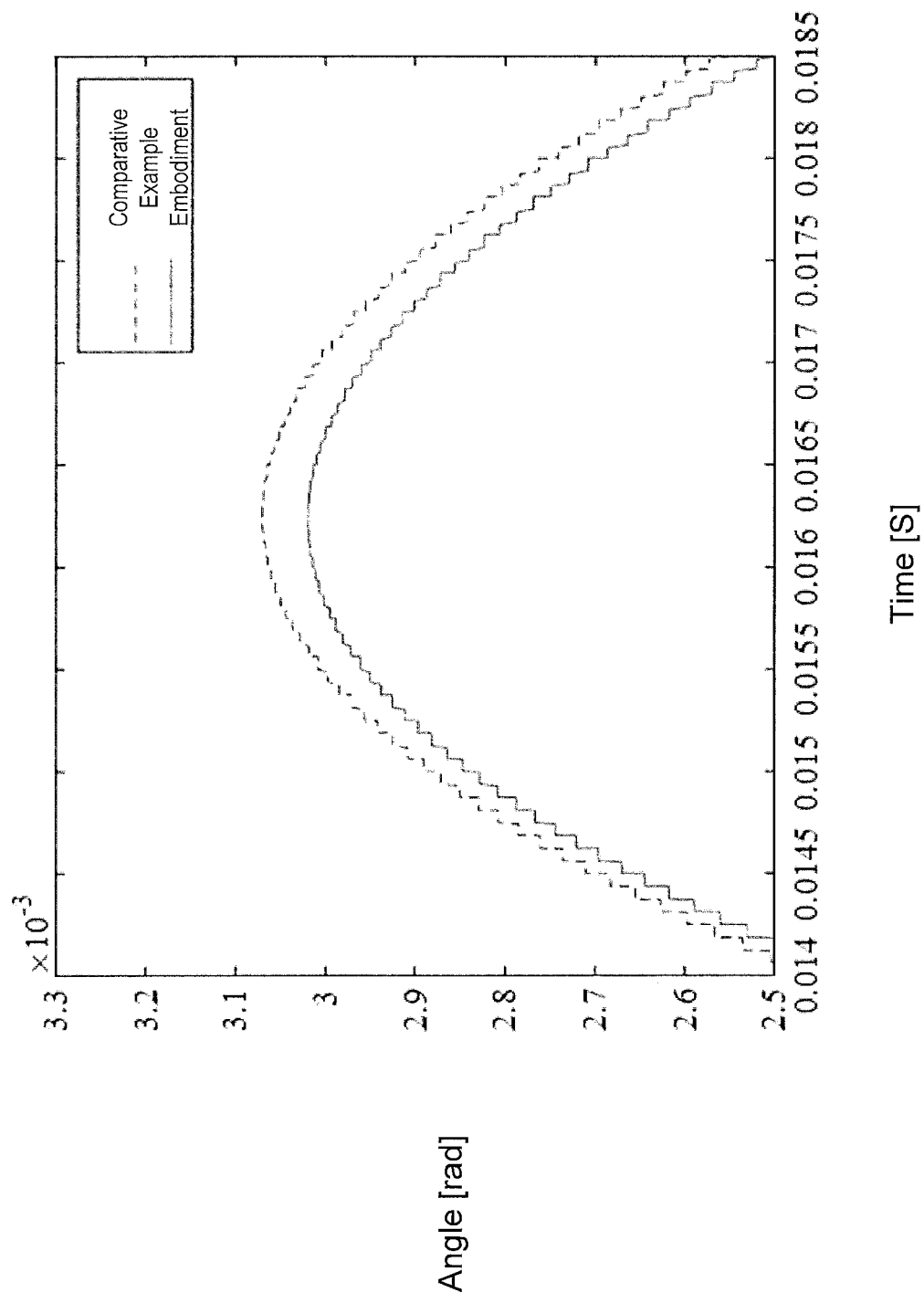
FIG. 11 is an enlarged view of a portion C in FIG. 10.
Figure 12:
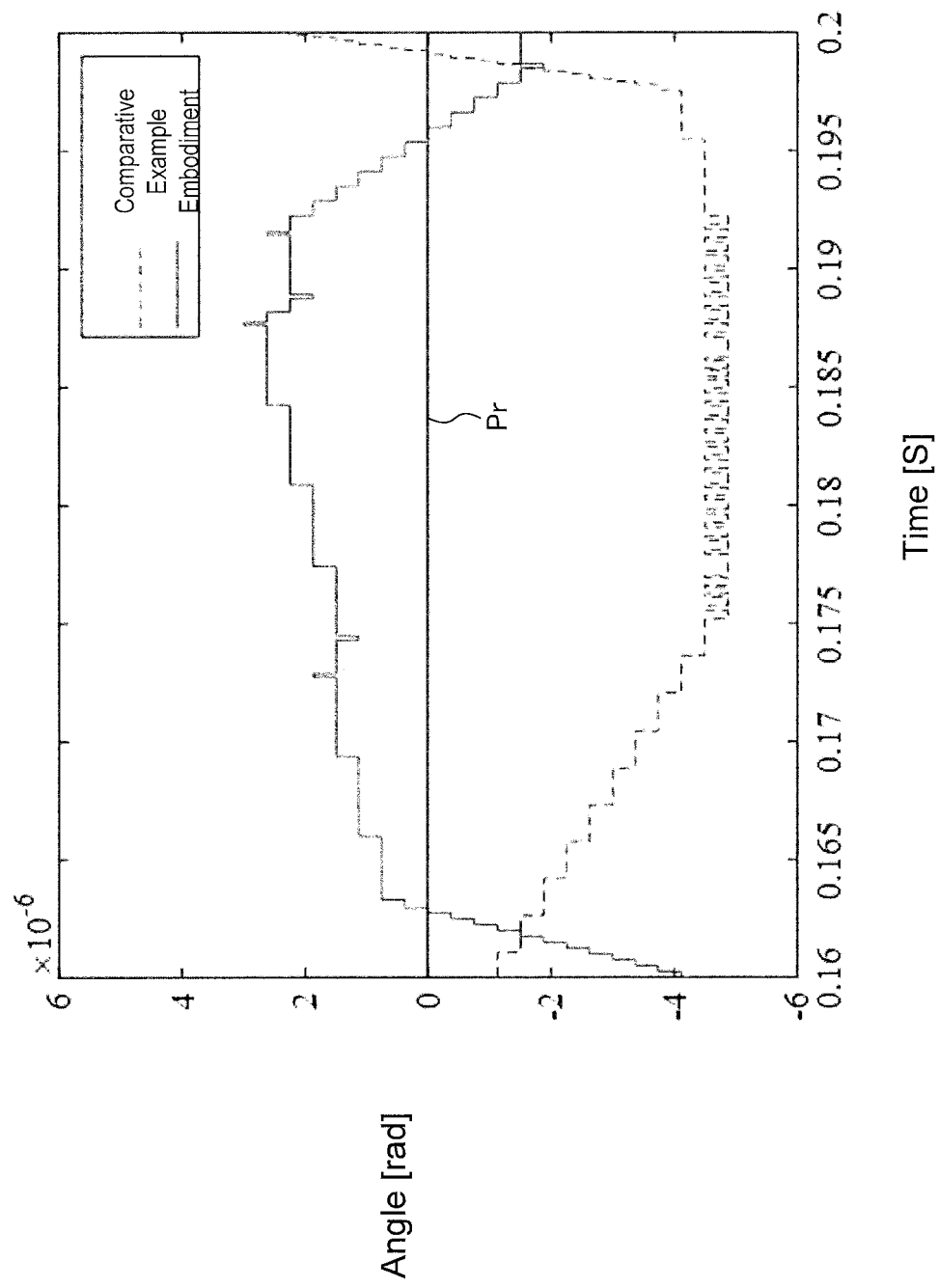
FIG. 12 is an enlarged view of a portion D in FIG. 10.

FIGS. 10 to 12 show an example of a simulation result of a position response when a step disturbance (for example, 1% of rated torque) is input at the time of position fixation. FIG. 11 is an enlarged view of a portion C of FIG. 10, and FIG. 12 is an enlarged view of a portion D of FIG. 10. In the figures, the broken line indicates the position response value of the comparative example, and the solid line indicates the position response value of the embodiment. Further, Pr in the drawing indicates the position command value (angle 0). As shown in FIG. 11, the peak of the position fluctuation due to the disturbance is smaller in the embodiment than in the comparative example. Further, as shown in FIG. 12, the convergence is faster in the embodiment than in the comparative example. From the above, it can be seen that the robustness against disturbance can be more improved in the embodiment than in the comparative example.

5. Example of Effect of Present Embodiment

As described above, the motor control system 1 according to the present embodiment includes the motor 7, the controller 5 that controls the motor 7, and the encoder 9 that detects the rotational position Pf of the motor 7 and transmits the rotational position Pf to the controller 5 via the communication path 18, wherein the controller 5 includes the transmitter 19 that transmits the torque command Tr to the encoder 9 via the communication path 20, the motor 7 being controlled in accordance with the torque command. The encoder 9 includes the position detecting unit 21 that detects the rotational position Pf of the motor 7, the receiving unit 23 that receives the torque command Tr from the transmitter 19 via the communication path 20, the disturbance estimating unit 25 that estimates the disturbance torque Td based on the rotational position Pf and the torque command Tr, and the transmitter 26 that transmits the rotational position Pf and the disturbance torque Td to the control unit 5 via the communication path 18.

In the motor control system 1, the controller 5 performs motor control in which the disturbance torque Td is compensated by using the disturbance torque Td estimated by the disturbance estimating unit 25 of the encoder 9. At this time, since the disturbance torque Td is estimated by the encoder 9, the following effects can be obtained.

In the case where the disturbance torque Td is estimated based on the rotational position Pf of the motor 7, a calculation corresponding to second order differentiation is required. Therefore, data up to two samples before the sampling data of the rotational position Pf is required. When the disturbance torque Td is estimated on the side of the controller 5' as in the comparative example described above, the disturbance estimating unit 27 of the controller 5' samples the rotational position Pf at the calculation cycle Ts of the controller 5', but the calculation cycle Ts by the CPU of the controller 5 is slower than the calculation cycle Tv of the encoder ASIC. For this reason, there is a possibility that the real-time property of the sampling data is deteriorated and good control performance for the motor 7 cannot be obtained.

In the present embodiment, the encoder 9 performs detection of the rotational position Pf and estimation calculation of the disturbance torque Td at the calculation cycle Tv faster than the calculation cycle Ts of the controller 5. Then, the encoder 9 transmits the rotational position Pf and the disturbance torque Td to the controller 5, and the controller 5 controls the motor 7 using the rotational position Pf and the disturbance torque Td. As a result, since the real-time property of the sampling data up to two sampling data before used in the disturbance estimation can be improved, the disturbance estimation with high real-time property can be performed. Therefore, it is possible to expand the band of the disturbance estimation, and the robustness against disturbance can be improved. Further, since the disturbance estimating unit 25 has an integrator (not shown) for performing an operation corresponding to second order differentiation, the disturbance torque Td value to be output can be smoother by making the calculation cycle faster. Thus, the control performance for the motor 7 can be enhanced.

6. Modification Examples

Note that the disclosed embodiments are not limited to the above, and various modifications can be made without departing from the purpose and technical idea thereof. Such a modification will be described below.

(6-1. Case of Calculating Rotational Acceleration by Encoder)

Figure 13:
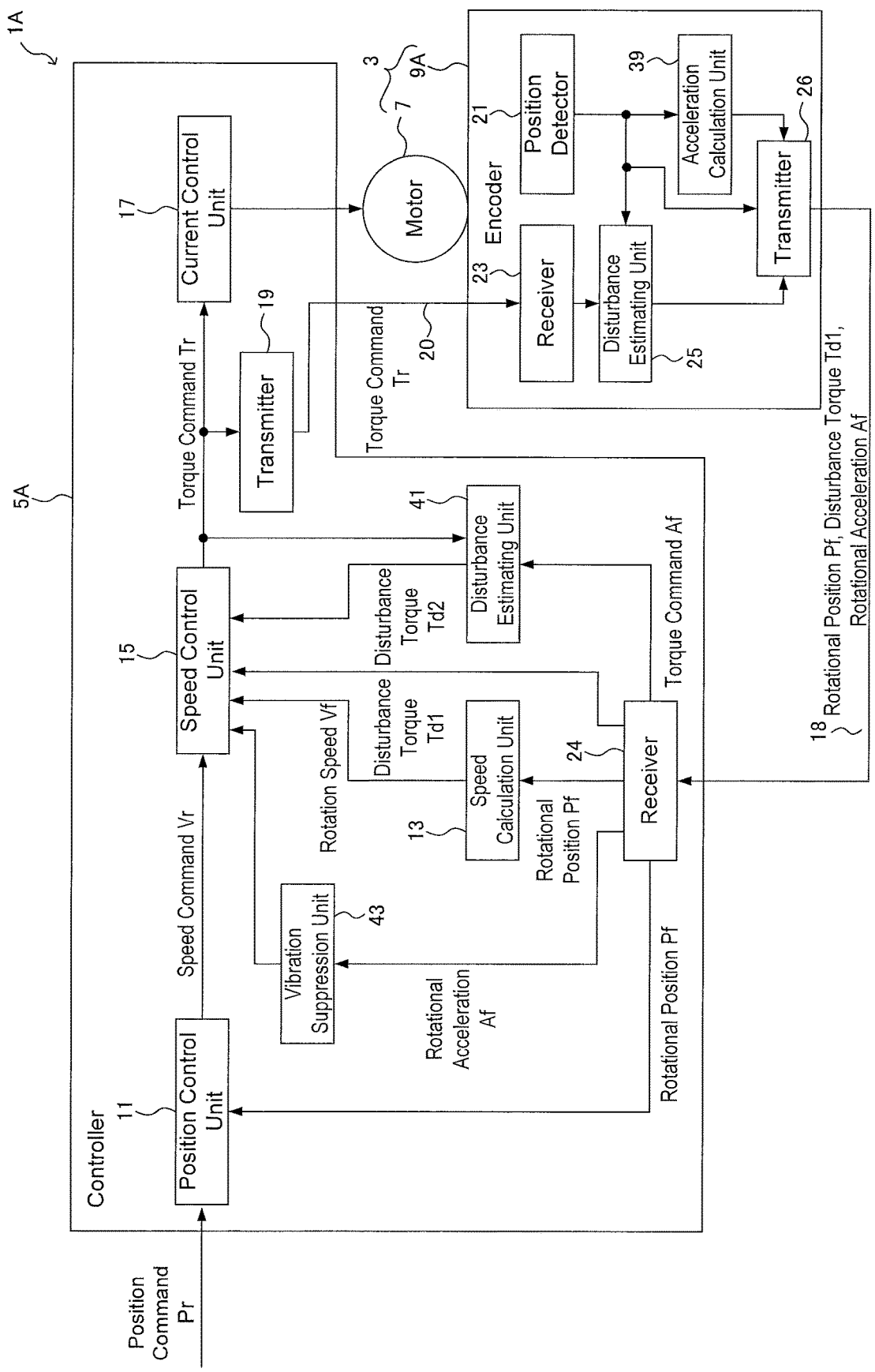
FIG. 13 is a diagram showing an example of the configuration of a motor control system according to a modification in which the rotational acceleration is calculated by the encoder.

FIG. 13 shows an example of the configuration of the 1A of the motor control system according to this modification. In FIG. 13, the same components as those in FIG. 1 are denoted by the same reference numerals, and the description thereof will be appropriately omitted.

As shown in FIG. 13, the motor control system 1A includes a controller 5A, a motor 7, and an encoder 9A. The encoder 9A includes an acceleration calculation unit (acceleration calculation circuitry) 39 in addition to the configuration of the encoder 9 described above. The acceleration calculation unit 39 calculates the rotational acceleration Af of the motor 7 by performing calculation corresponding to second order differentiation of the rotational position Pf detected by the position detecting unit 21. The transmitter 26 transmits the rotational position Pf, the disturbance torque Td1 (an example of the first disturbance torque Td) estimated by the disturbance estimating unit 25, and the rotational acceleration Af to the controller 5A via the communication path 18.

Thus, the controller 5A can execute various processes using the rotational accelerations Af transmitted from the encoder 9A. Therefore, it is possible to realize higher-performance control based on the detection information of the encoder 9 having a high added value. For example, in this modification, the controller 5A includes the disturbance estimating unit 41. The disturbance estimating unit 41 estimates the disturbance torque Td2 (an example of the second disturbance torque) based on the torque command Tr and the rotational acceleration Af received from the transmitter 26 of the encoder 9A via the communication path 18. The speed control unit 15 generates a torque command Tr based on the rotation speed Vf calculated by the speed calculation unit 13, the disturbance torque Td1 received from the encoder 9A, and the disturbance torque Td2 calculated by the disturbance estimating unit 41, and outputs the torque command Tr to the current control unit 17.

As described above, since the disturbance estimation is performed using the rotational accelerations Af calculated on the encoder 9A side instead of performing the calculation corresponding to the second order differential of the rotational position Pf on the controller 5A side, it is possible to perform the disturbance estimation with high real-time properties. In addition, since the disturbance estimating units 25, 41 are provided on both the encoder 9A and the controller 5A, backup or the like can be performed by doubling the disturbance estimating unit 25, and reliability can be improved. Further, for example, by performing the disturbance estimation of the high-frequency band on the encoder 9A side having a fast calculation cycle and performing the disturbance estimation of the low-frequency band on the controller 5A side having a slow calculation cycle, it is possible to realize the disturbance estimation with high resolution in which the band is further expanded by using the two disturbance estimating units 25, 41 and having different dynamic ranges.

In addition, the controller 5A may include a vibration suppression unit (vibration suppression circuitry) 43 as an example of processing using the rotational acceleration Af transmitted from the encoder 9A. The vibration suppression unit 43 performs calculation for suppressing vibration of the motor 7 based on the rotational acceleration Af received from the transmitter 26 of the encoder 9A via the communication path 18. The speed control unit 15 generates a torque command Tr based on the calculation result of the vibration suppression unit 43 and outputs the torque command Tr to the current control unit 17. Thus, it is possible to perform motor control in which vibration is compensated.

(6-2. Case of Calculating Rotation Speed by Encoder)

Figure 14:
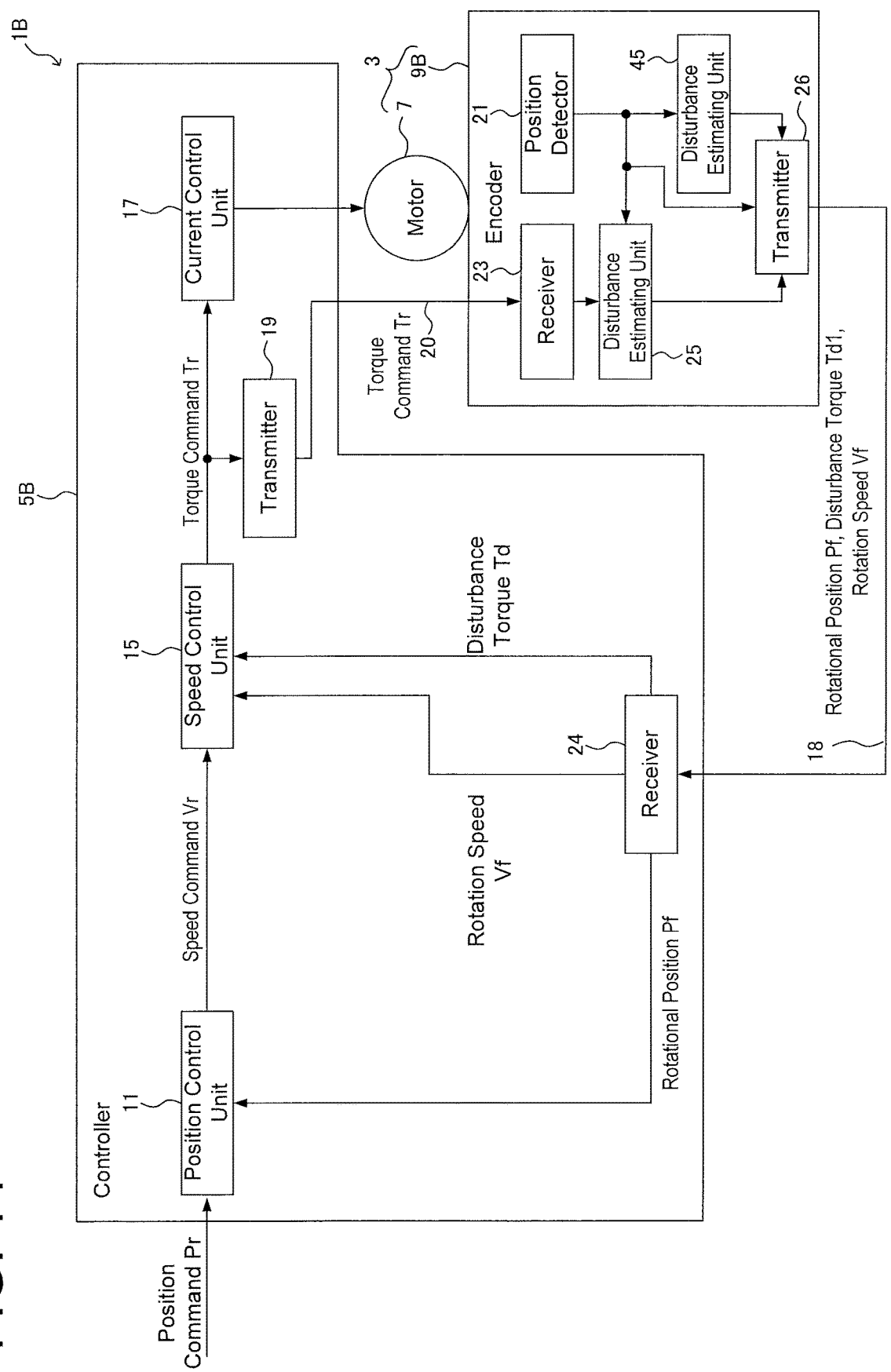
FIG. 14 is a diagram showing an example of a configuration of a motor control system according to a modified example in which rotation speed is calculated by an encoder.

FIG. 14 shows an example of the configuration of the motor control system 1B according to this modification. In FIG. 14, the same configuration as those in FIG. 1 and the like are denoted by the same reference numerals, and the description thereof will be omitted as appropriate.

As shown in FIG. 14, the motor control system 1B includes a controller 5B, a motor 7, and an encoder 9B. The encoder 9B includes a speed calculation unit 45 in addition to the configuration of the encoder 9 described above. The speed calculation unit 45 calculates the rotation speed Vf of the motor 7 by performing calculation corresponding to first order differentiation of the rotational position Pf detected by the position detecting unit 21. The transmitter 26 transmits the rotation speed Vf to the controller 5B via the communication path 18 together with the rotational position Pf and the disturbance torque Td estimated by the disturbance estimating unit 25.

The speed control unit 15 of the controller 5B performs speed control based on the speed command Vr and the rotation speed Vf received from the transmitter 26 of the encoder 9B via the communication path 18. The speed control unit 15 performs motor control in which the disturbance torque Td compensated based on the disturbance torque Td received from the encoder 9B. Thus, speed control is performed using the rotation speed Vf calculated on the encoder 9B side instead of performing calculation of the rotation speed Vf (first order differentiation of the rotational position Pf) on the controller 5B, and thus speed control with high real-time properties is possible. Further, the controller 5B can execute various processes using the rotation speed Vf transmitted from the encoder 9B. For example, although not shown, similarly to FIG. 13 described above, the disturbance estimating unit that estimates the disturbance torque Td using the rotation speed Vf transmitted from the encoder 9B may be mounted on the controller 9B side, and the disturbance estimating unit 25 may be duplicated. Therefore, it is possible to realize higher-performance control based on the detection information of the encoder 9 having a high added value.

In addition to the methods described above, the methods according to the embodiments and the modified examples may be appropriately combined and used. In addition, although not illustrated one by one, the above-described embodiment and each modification example are implemented by adding various changes within a range not departing from the gist thereof.

7. Hardware Configuration Example of Control Device

Figure 15:
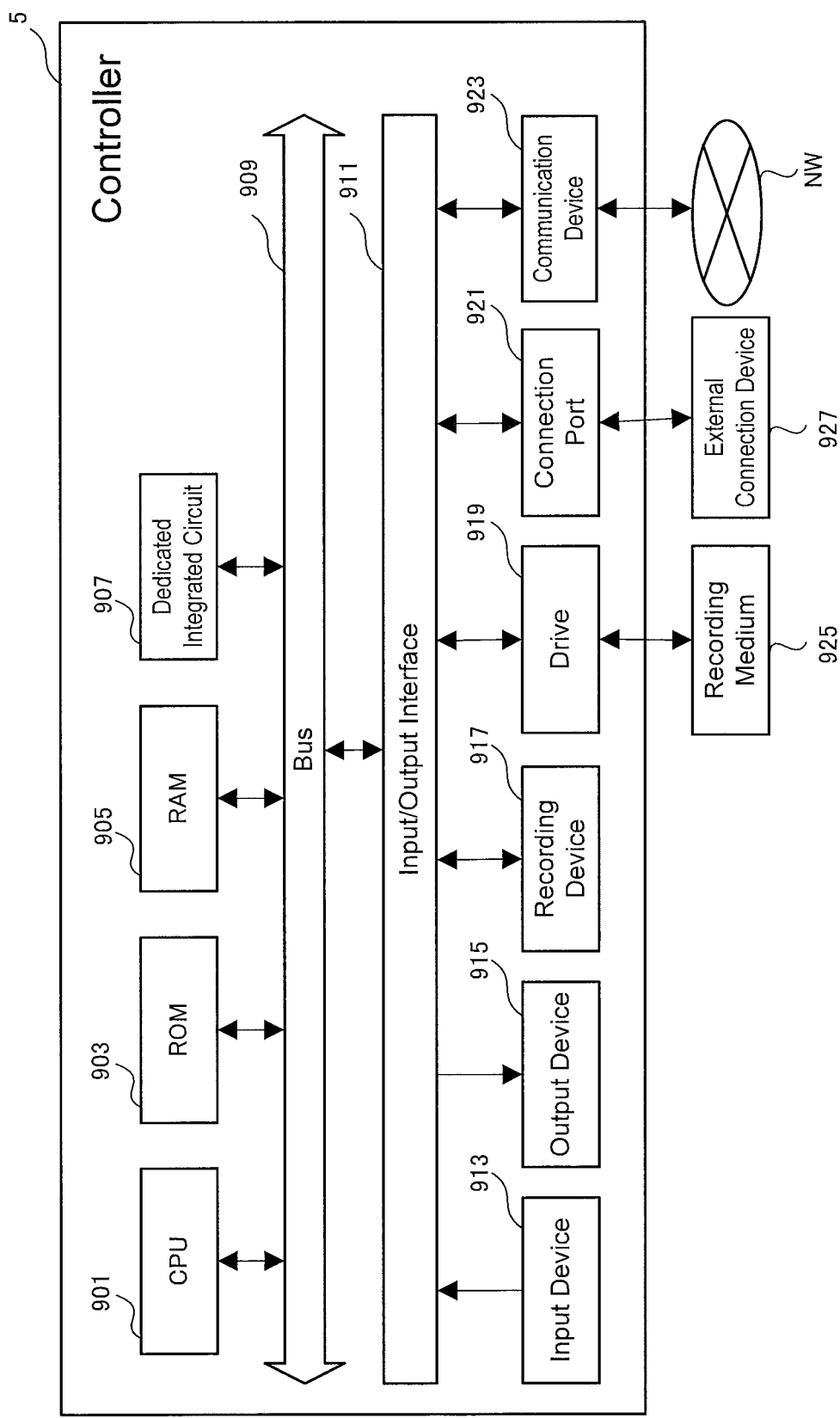
FIG. 15 is a diagram illustrating an example of a hardware configuration of the controller.

Next, with reference to FIG. 15, a hardware configuration example of the controller 5 that realizes processing by the position control unit 11, the speed calculation unit 13, the speed control unit 15, the current control unit 17, the transmitter 19, and the like implemented by the program executed by the CPU901 described above will be described. In FIG. 15, the configuration related to the function of supplying drive power to the motor 7 of the controller 5 is omitted as appropriate.

As illustrated in FIG. 15, the controller 5 includes, for example, CPU901, ROM903, RAM905, dedicated integrated circuit 907 constructed for specific applications such as ASICs or FPGAs, an input device 913, an output device 915, a recording device 917, a drive 919, a connection port 921, and a communication device 923. These components are connected to each other via a bus 909 and an input/output interface 911 so that signals can be transmitted therebetween.

The program can be recorded in, for example, the ROM903, the RAM905, the recording device 917, or the like.

In addition, the program may be temporarily or non-temporarily (permanently) recorded in a removable recording medium 925 such as a flexible disk, a magnetic disk, an optical disk such as various CDs, MO disks, or DVDs, or a semiconductor memory. Such a recording medium 925 can also be provided as so-called package software. In this case, the program recorded in the recording medium 925 may be read by the drive 919 and recorded in the recording device 917 via the input/output interface 911, the bus 909, or the like.

Further, the program may be recorded in, for example, a download site, another computer, another recording device, or the like (not shown). In this case, the program is transferred via a network NW such as a LAN or the Internet, and the communication device 923 receives the program. The program received by the communication device 923 may be recorded in the recording device 917 via the input/output interface 911, the bus 909, or the like.

The program can also be recorded in, for example, an appropriate external connection device 927. In this case, the program may be transferred via an appropriate connection port 921 and recorded in the recording device 917 via the input/output interface 911, the bus 909, or the like.

Then, the CPU901 executes various processes in accordance with the program recorded in the recording device 917, realizing the processes by the position control unit 11, the speed calculation unit 13, the speed control unit 15, the current control unit 17, the transmitter 19, and the like. At this time, the CPU901 may directly read the program from the recording device 917 and execute the program, or may load the program into the RAM905 and execute the program. Furthermore, when the CPU901 receives a program via the communication device 923, the drive 919, or the connection port 921, for example, the received program may be directly executed without recording the program in the recording device 917.

If necessary, the CPU901 may perform various processes based on signals and information input from the input device 913 such as a mouse, a keyboard, and a microphone (not shown).

Then, the CPU901 may output the result of executing the above-described processing from an output device 915 such as a display device or an audio output device. Further, the CPU901 may transmit the processing result via the communication device 923 or the connection port 921 as necessary, or may record the processing result in the recording device 917 or the recording medium 925.

The present invention is not limited to the above-described embodiments. Within the scope of the present invention, the above-described embodiments can be freely combined, as well as any components in the embodiments can be modified or omitted.

What is claimed is:

1. A motor control system comprising:
   a motor;
   a controller comprising a controller transmitter configured to transmit a torque command to control the motor; and
   an encoder comprising:
      a position detector configured to detect a rotational position of the motor;
      an encoder receiver configured to receive the torque command from the controller transmitter;
      first disturbance estimating circuitry configured to estimate a first disturbance torque based on the rotational position and the torque command; and
      an encoder transmitter configured to transmit the rotational position and the first disturbance torque to the controller.

2. The motor control system according to claim 1, wherein the encoder comprises acceleration calculation circuitry configured to calculate a rotational acceleration of the motor based on the rotational position, and wherein the encoder transmitter configured to transmit the rotational acceleration to the controller.

3. The motor control system according to claim 2, wherein the controller comprises second disturbance estimating circuitry configured to estimate a second disturbance torque based on the torque command and the rotational acceleration received from the encoder transmitter.

4. The motor control system according to claim 3,
wherein the encoder includes speed calculation circuitry configured to calculate the rotation speed of the motor based on the rotational position, and
wherein the encoder transmitter configured to transmit the rotation speed to the controller.

5. The motor control system according to claim 2, wherein the controller comprises vibration suppression circuitry configured to calculate suppressing vibration of the motor based on the rotational acceleration received from the encoder transmitter.

6. The motor control system according to claim 5,
wherein the encoder includes speed calculation circuitry configured to calculate the rotation speed of the motor based on the rotational position, and
wherein the encoder transmitter configured to transmit the rotation speed to the controller.

7. The motor control system according to claim 2,
wherein the encoder includes speed calculation circuitry configured to calculate the rotation speed of the motor based on the rotational position, and
wherein the encoder transmitter configured to transmit the rotation speed to the controller.

8. The motor control system according to claim 1,
wherein the encoder includes speed calculation circuitry configured to calculate the rotation speed of the motor based on the rotational position, and
wherein the encoder transmitter configured to transmit the rotation speed to the controller.

9. The motor control system according to claim 8,
wherein the controller comprises
position control circuitry configured to output a speed command based on a position command that is input from a host controller and the rotational position received from the encoder transmitter, and
speed control circuitry configured to output the torque command based on the speed command and the rotation speed received from the encoder transmitter.

10. An encoder comprising:
a position detector configured to detect a rotational position of a motor;
an encoder receiver configured to receive a torque command from a controller transmitter of a controller to control the motor;
disturbance estimating circuitry configured to estimate a disturbance torque based on the rotational position and the torque command; and
an encoder transmitter configured to transmit the rotational position and the disturbance torque to the controller.

11. The encoder according to claim 10, further comprising:
acceleration calculation circuitry configured to calculate a rotational acceleration of the motor based on the rotational position, wherein the encoder transmitter is configured to transmit the rotational acceleration to the controller.

12. The encoder according to claim 11, further comprising:
speed calculation circuitry configured to calculate a rotation speed of the motor based on the rotational position, wherein the encoder transmitter is configured to transmit the rotation speed to the controller.

13. The encoder according to claim 10, further comprising:
speed calculation circuitry configured to calculate a rotation speed of the motor based on the rotational position, wherein the encoder transmitter is configured to transmit the rotation speed to the controller.

14. A servo motor comprising:
a motor; and
an encoder comprising:
- a position detector configured to detect a rotational position of the motor;
- an encoder receiver configured to receive a torque command from a controller transmitter of a controller to control the motor;
- disturbance estimating circuitry configured to estimate a disturbance torque based on the rotational position and the torque command; and
- an encoder transmitter configured to transmit the rotational position and the disturbance torque to the controller.

15. The servo motor according to claim 14, wherein the encoder further comprises acceleration calculation circuitry configured to calculate a rotational acceleration of the motor based on the rotational position, wherein the encoder transmitter is configured to transmit the rotational acceleration to the controller.

16. The servo motor according to claim 15, wherein the encoder further comprises speed calculation circuitry configured to calculate a rotation speed of the motor based on the rotational position, wherein the encoder transmitter is configured to transmit the rotation speed to the controller.

17. The servo motor according to claim 14, wherein the encoder further comprises speed calculation circuitry configured to calculate a rotation speed of the motor based on the rotational position, wherein the encoder transmitter is configured to transmit the rotation speed to the controller.

* * * * *